US009925543B2

(12) United States Patent
Caleffi

(10) Patent No.: US 9,925,543 B2
(45) Date of Patent: Mar. 27, 2018

(54) MAGNETIC PARTICLE SEPARATOR FOR THERMAL SYSTEMS

(75) Inventor: Marco Caleffi, Fontaneto d'Agogna (IT)

(73) Assignee: CALEFFI S.P.A., Fontaneto d'Agogna (IT)

(*) Notice: Subject to any disclaimer, the term of this patent is extended or adjusted under 35 U.S.C. 154(b) by 543 days.

(21) Appl. No.: 14/344,172

(22) PCT Filed: Feb. 2, 2012

(86) PCT No.: PCT/EP2012/051785
§ 371 (c)(1),
(2), (4) Date: Mar. 21, 2014

(87) PCT Pub. No.: WO2013/041245
PCT Pub. Date: Mar. 28, 2013

(65) Prior Publication Data
US 2014/0367340 A1 Dec. 18, 2014

(30) Foreign Application Priority Data
Sep. 19, 2011 (IT) .................... MI11A1687

(51) Int. Cl.
B03C 1/30 (2006.01)
B03C 1/28 (2006.01)
B01D 35/06 (2006.01)

(52) U.S. Cl.
CPC ............ B03C 1/30 (2013.01); B01D 35/06 (2013.01); B03C 1/288 (2013.01);
(Continued)

(58) Field of Classification Search
CPC ........... B03C 1/28; B03C 1/284; B03C 1/288; B03C 1/30; B03C 2201/18;
(Continued)

(56) References Cited

U.S. PATENT DOCUMENTS 2,437,221 A * 3/1948 Cox ................. B01D 35/06
210/223
3,460,679 A 8/1969 Llewellyn
(Continued)

FOREIGN PATENT DOCUMENTS

DE 19717869 12/1997
DE 102004029197 1/2006
(Continued)

OTHER PUBLICATIONS

International Search Report Dated Issued in PCT/EP2012/051785.

Primary Examiner — David C Mellon
(74) Attorney, Agent, or Firm — Silvia Salvadori, P.C.; Silvia Salvadori

(57) ABSTRACT

A magnetic particle separator (10) suitable for separating magnetic and non-magnetic particles from a thermal fluid flowing in a heating system. The magnetic particle separator (10) comprises a hollow body (10A, 10B) configured with an upper particle separation chamber (11) and for circulation of the thermal fluid between an inlet and an outlet port (12, 13), and a quieting chamber (15) beneath the particle separation chamber (11) for accumulation of the particles separated from the fluid: an annular support element (21) for permanent magnets (18) being removably fastened outside the quieting chamber (15) of the separator (10).

9 Claims, 3 Drawing Sheets

(52) U.S. Cl.
CPC ...... *B03C 2201/18* (2013.01); *B03C 2201/20* (2013.01); *B03C 2201/28* (2013.01)

(58) Field of Classification Search
CPC ............. B03C 2201/20; B03C 2201/28; F24D 19/0092; B01D 35/06; B01D 21/0009
See application file for complete search history.

(56) References Cited

U.S. PATENT DOCUMENTS

| | | |
|---|---|---|
| 4,052,312 A | 10/1977 | King |
| 4,529,517 A * | 7/1985 | Carlvret .................. B03C 1/286 |
| | | 210/223 |
| 4,585,553 A * | 4/1986 | Hikosaka ............. B01D 29/114 |
| | | 210/107 |
| 5,089,129 A * | 2/1992 | Brigman ................ B01D 35/06 |
| | | 210/223 |
| 5,354,462 A | 10/1994 | Perritt |
| 5,510,024 A | 4/1996 | Caiozza |
| 5,714,063 A | 2/1998 | Brunsting |
| 5,817,233 A | 10/1998 | Cooper |
| 2006/0037902 A1 | 2/2006 | Pedersen |
| 2007/0152791 A1 | 7/2007 | Lee |
| 2008/0149549 A1 | 6/2008 | Lee |

FOREIGN PATENT DOCUMENTS

| | | | |
|---|---|---|---|
| EP | 0110674 | 6/1984 | |
| EP | 2614893 A1 * | 7/2013 | ............. B01D 35/06 |
| GB | 850233 | 10/1960 | |
| WO | 2004105954 | 12/2004 | |

* cited by examiner

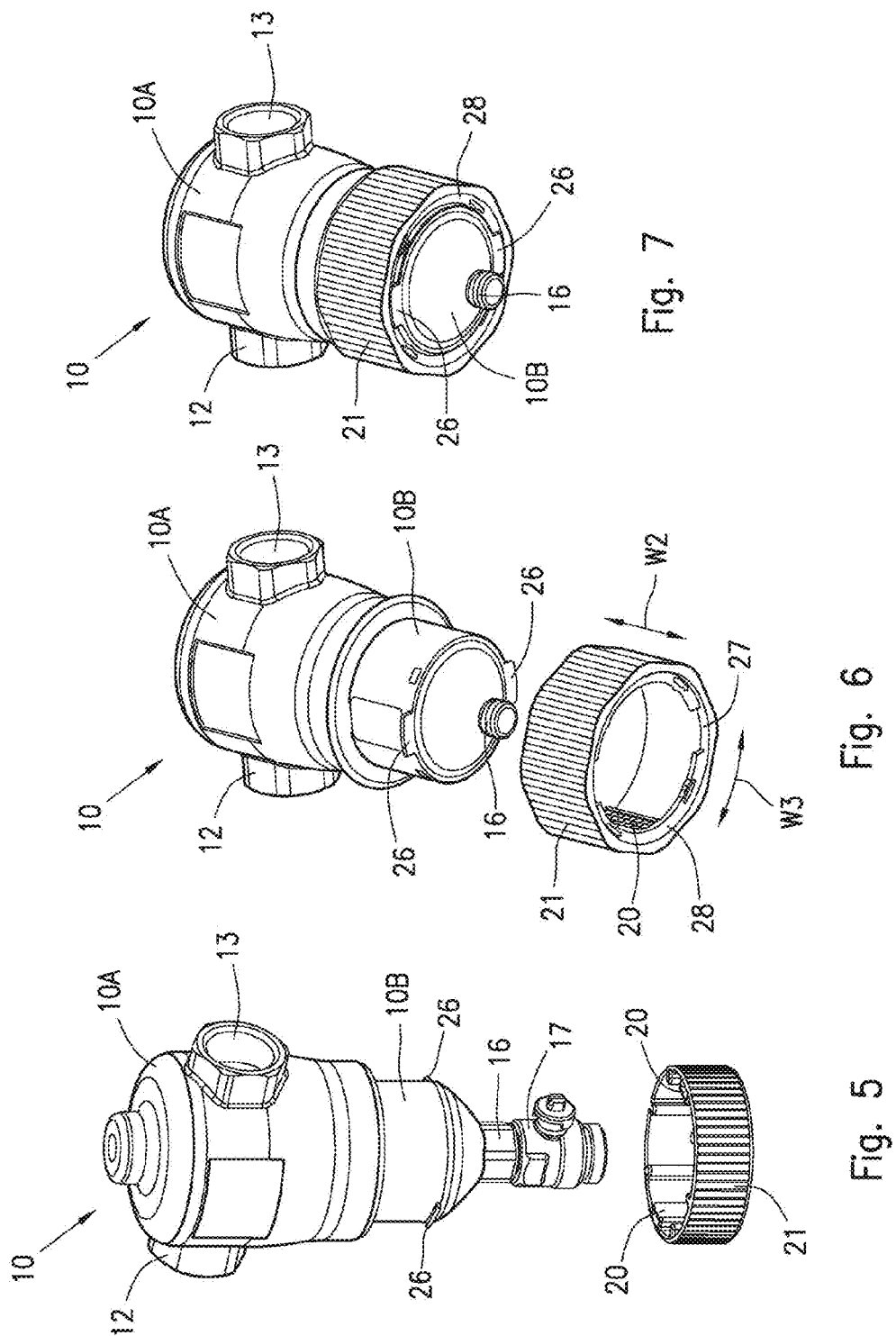

MAGNETIC PARTICLE SEPARATOR FOR THERMAL SYSTEMS

This application is a U.S. national stage of PCT/EP2012/051785 filed on Feb. 2, 2012 which claims priority to and the benefit of Italian Application No. MI2011A001687, filed on Sep. 19, 2011, the contents of which are incorporated herein by reference in their entireties.

BACKGROUND OF THE INVENTION

The invention relates to a device for separating particle material from a fluid circulating in a heating system, that accumulates and is periodically purged as sludge; in particular the invention is directed to a magnetic particle separator suitable for separating both magnetic or ferrous particles resulting from the internal corrosion of pipes and/or equipments of a heating system, as well as non-magnetic or non-ferrous particles resulting from dirt in the flowing thermal fluid. Although, according to the invention the magnetic particle separator is suitable for any application, it is particularly suitable for application both in household and centralized heating systems for civil and/or industrial use.

STATE OF THE ART

As is well known, the thermal fluid that circulates in a heating system tends to entrain a quantity of non magnetic particles due to the dirt present or formed in the same fluid, and magnetic particles due to the internal corrosion of metal pipes, radiators and/or other equipment in a heating system.

If these dirty particles and/or magnetic particles resulting from corrosion are not removed, they tend to accumulate in critical parts of the heating system, such as valves and/or fluid circulation pumps, thus altering the designing parameters or even causing damage to the system.

A magnetic device for separating magnetic or ferrous particles from a fluid circulating in a heating system is described for example in WO-A-2004/105954; the device comprises a container configured with a chamber for magnetic separation of particles, having an inlet and an outlet port for the fluid spaced apart in the axial direction of the container. The device also comprises a magnetic bar totally dipped into the fluid, which axially extends into a particle separation chamber, between fluid inlet and outlet ports. The magnetic bar is detachably fastened to a cover and can be removed when the magnetic particles that have adhered to the magnet need to be removed.

In a similar magnetic separator device, in addition to not being able to hold non-magnetic particles of the fluid, the withdrawal of the magnet and the removal of the magnetic particles would necessarily require the container to be opened, consequently stopping the circulation of the pressurised fluid by providing suitable valves upstream and downstream of the same separator device.

In order to allow the removal of the magnetic particles that have adhered to a magnet, without having to open the separator device, GB-A-850.233 and WO-A-2009/122127 proposed to place a magnet, or a plurality of magnets in respective tubular casings to prevent a direct contact of the magnet or magnets, with the circulating fluid, and the removal of the same magnets without having to open the separator device.

In particular, the separator according to GB-A-850233 comprises a container of non-magnetic material, configured with an upper filtering chamber in which magnetic groups extend within respective tubular protective casings. The container is also provided with a collecting and purging chamber for sludge and magnetic particles that periodically are made to fall down merely by removing the magnetic groups from their respective tubular housings; a plurality of guide plates in the upper chamber allow the fluid to flow as dipped as possible in the magnetic field generated by the permanent magnets.

In turn WO-A-2009/122127 discloses a cyclonic particle separator, comprising a fluid-inlet annular channel, in which a cyclonic movement of the fluid is created to cause the separation of the particles due to the centrifugal force, which continues in the lower conical part from which the fluid moves up into a central sleeve connected to an outlet port; the fluid maintains a cyclonic movement around a central magnet which axially extends in a protective tubular element.

A special quieting area is provided at the bottom of the separator, where the particles of dirt separated by the cyclonic action are collected to be later discharged by removing a closure cap; again the magnetic particles which have been attracted by the magnetic field of the internal magnet, are allowed to drop down to the bottom by simply removing the magnet.

Both in GB-A-850233 and in WO-A-2009/122127 the magnets are therefore positioned in the upper particle separation chamber, where the magnetic flux is directly crossed by the fluid circulating in a swirling condition; therefore to carry out the cleaning operations with this type of magnetic separator, it is necessary to stop the circulation of the fluid, for example by stopping the circulation pumps, or by closing a proper valve downstream the separator to prevent dirt particles from being entrained by the fluid. With this kind of magnetic separator, it is therefore not possible to perform cleaning operations and removal of the sludge while the system is working.

OBJECTS OF THE INVENTION

One of the objects of the present invention is to provide a device for separating magnetic and non-magnetic particles from a fluid circulating in a heating system, configured so that the magnetic attraction of the particles can occur in an area of the fluid substantially free from any turbulence.

Another object of the invention is to provide a magnetic particle separation device for magnetic particles entrained by a thermal fluid flowing in a heating system, wherein the removal of the magnetic particles retained by the magnetic field can be carried out very quickly in a very short time, both while the system is stopped, exploiting the static pressure of the same system, and while the fluid is circulating, with the heating system in working condition.

SHORT DESCRIPTION OF THE INVENTION

The above is made possible by a magnetic particle separator suitable for separating ferrous or magnetic, and non-ferrous or non-magnetic particles from a thermal fluid flowing in a heating system, according to claim 1.

In particular, the solution according to the present invention differs from known particle separators, in that the magnets for attracting the magnetic particles are positioned outside a quieting chamber, below a particle separation chamber, where the substantial reduction of the fluid velocity tends to create a quieting zone that facilitates the fall down and accumulation of particles, and in particular the magnetic attraction of the magnetic particles towards a peripheral wall of the same quieting chamber.

A transition zone may be advantageously provided between the particle separation chamber and the quieting chamber to damp any whirling motion in the fluid, allowing the separated particles to freely fall down.

SHORT DESCRIPTION OF THE DRAWINGS

These and other features, and some preferential embodiments of a magnetic particle separator device according to the present invention, will become more evident from the following description, with reference to the attached drawings, in which:

FIG. 5 is a perspective view of a second embodiment of a magnetic particle separator according to the invention, with the support for the magnets differently configured, in a removed condition;

FIG. 6 is a different perspective view of the magnetic particle separator of FIG. 5, which shows a system for fastening the magnet support to body of the separator;

FIG. 7 is a perspective view similar to that in FIG. 6, with the magnet support in an assembled condition.

DETAILED DESCRIPTION OF THE INVENTION

Figure 1:
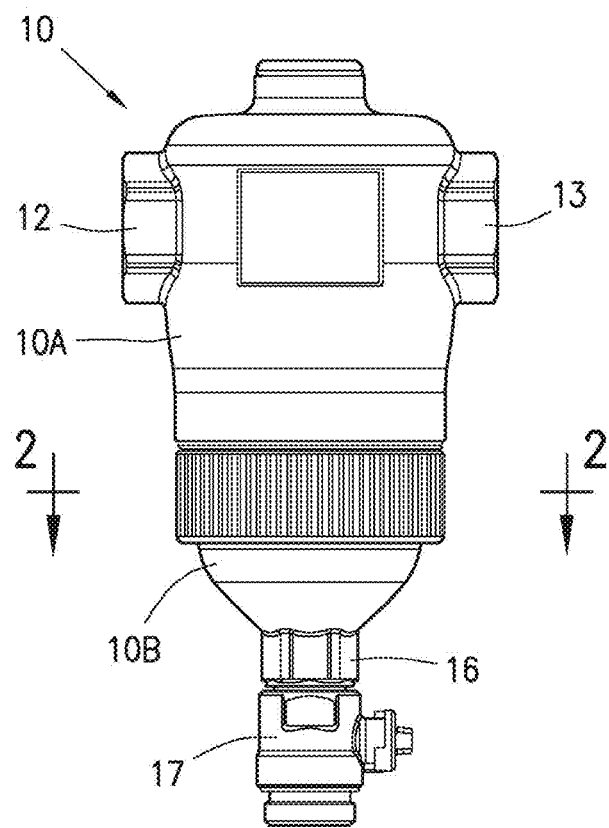
FIG. 1 is a view of a first embodiment of a magnetic particle separator, according to the present invention.

With reference to FIGS. 1-4 a first embodiment of a magnetic particle separator according to the invention will be now described.

The magnetic particle separator comprises a hollow body 10 made of brass or another suitable non-magnetic material, consisting of a cup shaped upper part 10A, and a cup shaped lower part 10B tightly screwed together. The upper part 10A of the body defines a first chamber 11, also referred to as particle separation chamber for the dirt entrained by the thermal fluid circulating in a heating system; the upper part 10A of the body is also provided with an inlet port 12 and an outlet port 13 for the fluid, and comprises means 14 for deviating and reducing the velocity of the fluid, that is suitable to allow a separation by gravity of the dirt particles entrained by the fluid.

The means 14 for the deviation and the reduction of the fluid velocity may be of any type; for example, it can take the form of a removable filtering cartridge consisting of a plastic reticular element spirally wound up, or of a plurality of radially arranged reticular elements for the gravitational separation of the magnetic and/or non-magnetic particles suspended in the fluid, for example as described in the patent IT 1348978 of the same applicant, incorporated herein for reference.

In turn, the lower part 10B of the body is provided with a second chamber 15, also referred to as quieting and particle accumulation chamber, in which the velocity and turbulence of the fluid are substantially reduced to zero. The lower quieting chamber 15 is axially aligned to and in fluid communication with the upper separation chamber 11, as well as comprises a peripheral wall and a bottom opening 16 for a periodic discharge of sludge through a drainage valve 17 that can be manually operated.

As previously reported, the magnetic particle separator 10 also comprises magnetic means for the capture and retention of the magnetic particles, which have been separated from the fluid and which fall down into the quieting chamber 15 from the upper chamber 11 due to gravity.

Unlike previously known solutions, which include one or more magnets inside the upper part of the separator in which the fluid is flowing in a turbulence condition, substantially dipped into the flow of fluid, the present invention differs in that the magnetic means for retaining the magnetic particles are positioned outside and around the quieting chamber 15 of the separator 10, namely in correspondence of an area of the quieting chamber substantially free from any turbulence.

In particular, according to the example in FIGS. 1-4, the magnetic means for capture and retention of the magnetic particles comprises two permanent magnets 18, radially polarized in a same or in opposite directions, positioned at the ends of a diameter of the lower part 10B of the body 10 of the separator; the magnets 18 have polar faces of a same polarity or different polarities, facing the inside of the quieting chamber 15 in order to generate flux lines that project towards the same quieting chamber 15, through the cylindrical or differently shaped peripheral wall of the lower part 10B of the body 10.

Figure 3:
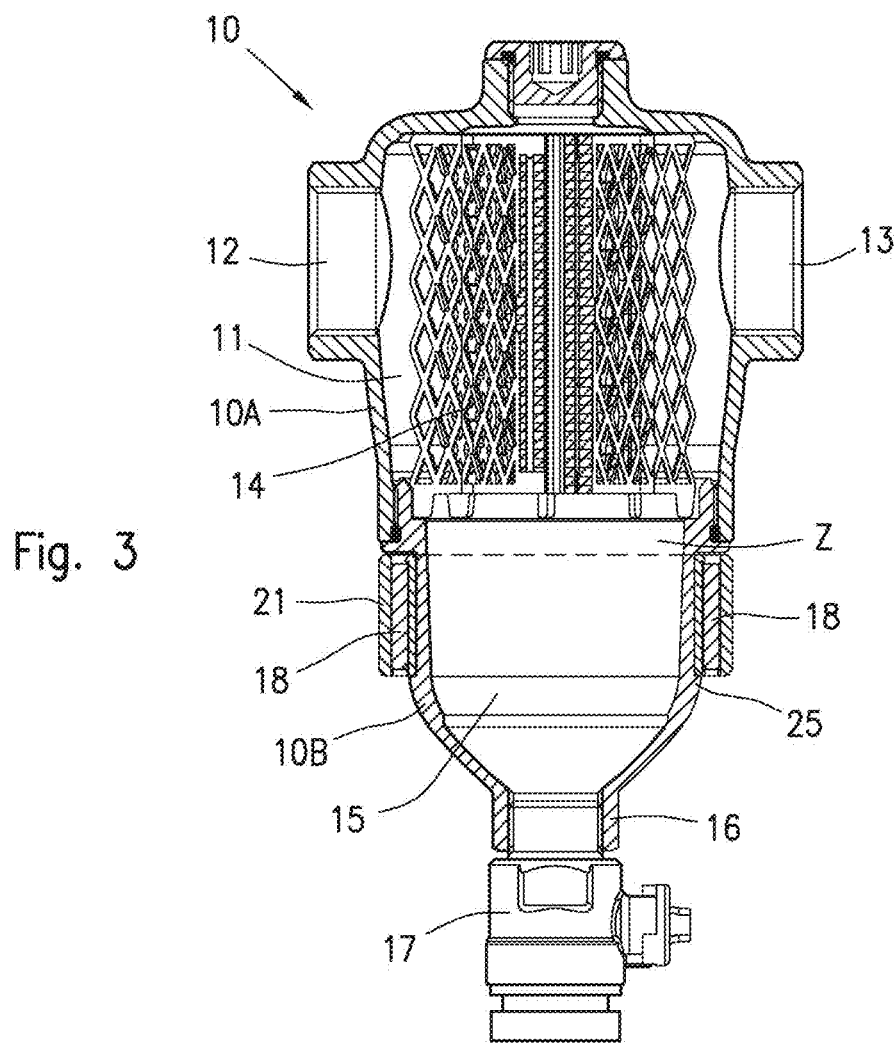
FIG. 3 is a cross-sectional view along line 3-3 of FIG. 2.

As shown in FIG. 3, during tests it has been advantageous to provide a transition zone Z between the particle separation chamber 11 and the quieting chamber 15, or more properly between the bottom side of the filtering cartridge 14 and the upper edges of the magnets 18, in which any residual whirling motion of the fluid outcoming from filtering cartridge 14 at the bottom side of the particle separation chamber 11, is substantially damped.

Figure 2:
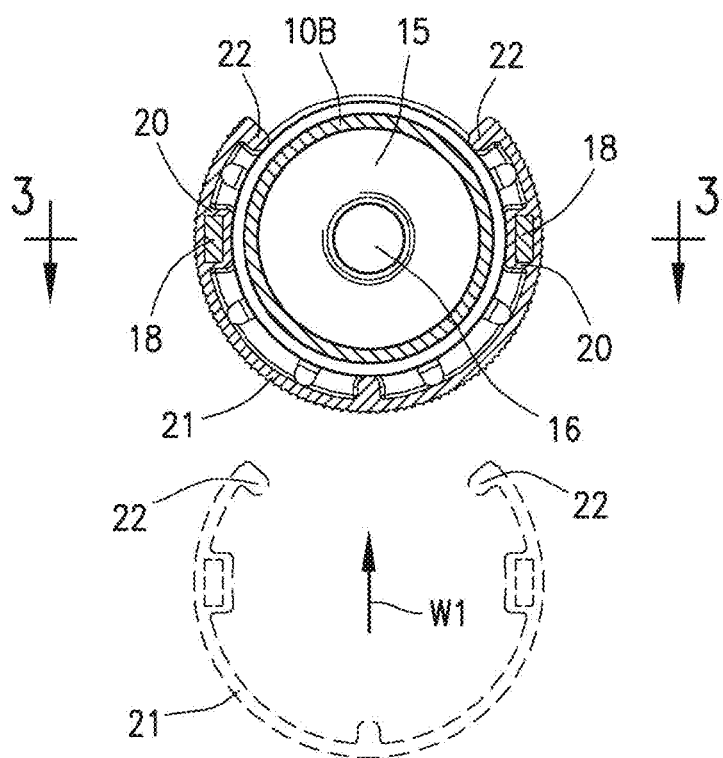
FIG. 2 is a cross sectional view along line 2-2 of FIG. 1.
Figure 4:
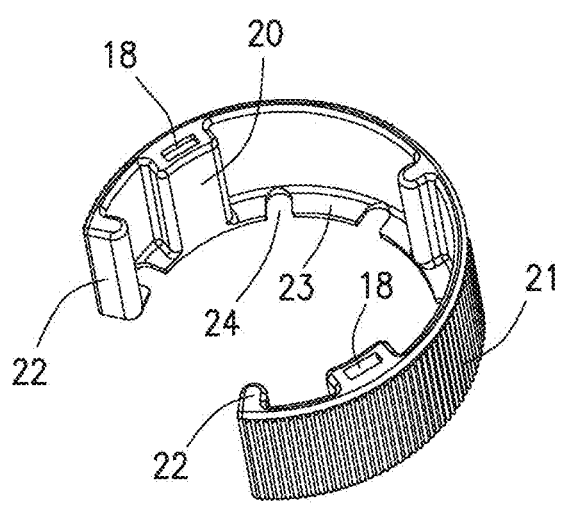
FIG. 4 is a perspective view of a first solution of the outer magnet support element.

According to this first example, shown in FIGS. 2 and 4, each of the two magnets 18 is housed in a respective seat 20 on the inner side of an annular support element 21 in a non magnetically conductive material, such as plastic material; in this regard, the annular support element 21 for the magnets 18 is C-shaped or opens at one side, and consists of an elastically flexible open widening band of plastic material provided with suitable clamping means to be snap engaged to the cylindrical outer surface of the lower part 10B of the body 10, through a radial thrust, thus preventing any accidental axial removal.

To this end, the C-shaped annular support element 21 for the magnets 18 has a longitudinal rib 22 at both ends to come into contact with and clamp the outer surface of the lower part 10B of the body. The two ribs 22 are spaced apart from one another by a space lower than the diameter of the cylindrical wall of the lower part 10B of the body, so as to allow an elastic widening of the same annular element 21, and its snap engagement with the lower part 10B of the separator body 10 when it is pushed radially in the direction of arrow W1, as shown by the dotted line in FIG. 2.

To prevent the support element 21 for the magnets 18 from accidentally falling axially down from the body 10B of the separator, it has been provided with a flange 23 along its lower edge radially extending inwards; the flange 23 is broken in several points by radial slits 24 to allow elastic deformation and widening of the C-shaped element 21; the inner edge of the flange 23 has substantially the same diameter as the outer cylindrical surface of the lower part 10B of the body, and is intended to rest against a shoulder 25 of the body portion 10B, preventing it from accidentally falling down.

The magnetic particle separator operates as follows: the fluid that circulates within the upper chamber 11, between the inlet and the outlet ports 12, 13, passes through the reticular filter 14 which generates a partial slowing down of the velocity of the fluid, causing the separation of the magnetic and non-magnetic particles which fall down through the transition zone Z, into the quieting chamber 15 due to gravity. In the quieting chamber 15 the non-magnetic particles are deposited on the bottom as sludge, while the magnetic particles are attracted by the two permanent magnets 18 towards the inner surface of the peripheral wall of the quieting chamber 15, thereby preventing them from being entrained back in the fluid flowing in the upper chamber 11.

The cleaning operations of the sludge and of the magnetic particles accumulated in the quieting chamber 15 can be carried out manually, simply by radially removing the annular element 21 housing the magnets 18; in this way the magnetic particles that have magnetically adhered to the inner surface of the quieting chamber 15, fall down to the bottom of the same chamber 15 to be discharged through the opening 16; this can be done either by stopping or while keeping the fluid circulating within the separator, as the area for magnetic attraction of magnetic particles is completely separated from the intermediate transition zone Z and the area of the upper chamber 11 in which the fluid flows.

It is precisely the positioning of the magnets 18, outside the quieting chamber 15 and in respect to the particle separation chamber 11 that allows the separator 10 to be cleaned even while the heating system is operative.

After cleaning, the operation of the magnetic particle separator 10 can be reactivated simply by snap fastening the support 21 for the magnets 18, manually pushing it in the direction of arrow W1, as shown by the dotted line in FIG. 2.

The proposed solution, in addition to improving functionality, is also simple in constructional terms and has a comparatively low cost; the substantial width of the elastic band of the annularly shaped magnet support 21, and the resulting axial extension of the magnets 18 positioned outside the quieting chamber 15, offers two significant advantages:

a first advantage consists of a convenient radial polarization of the magnets 18 which allows a uniform magnetic field to be obtained along a large retaining area of the quieting chamber 15, in a zone free from any turbulence and at a fluid velocity tending to zero;

a second advantage consists in maintaining a large flow section for the fluid, with a limited pressure drop in upper particle separation chamber 11 containing the filter 14 or other suitable device for separating the particles entrained by the thermal fluid.

FIGS. 5 to 7 show a second possible embodiment for a magnetic particle separator according to the invention. The solution shown in FIGS. 5-7 has the same general characteristics, and operates substantially in the same way as the previous solution, differing in the shape of the removable magnet support element; therefore in FIGS. 5 to 7 the same reference numbers were used as in the previous FIGS. 1 to 4, for similar or equivalent parts.

Unlike the previous solution in which the annular support member 21 for the magnets 18 is in the form of a side open ring, in this second case the annular support element 21 for the magnets 18 is configured as a closed ring that can be axially pushed and pulled to be assembled and removed from the bottom, as indicated by the double arrow W2 in FIG. 6, keeping the position of the magnets 18 unchanged with respect to the quieting chamber 15 in the lower part 10B of the body of the separator 10.

Again in this case the lower part 10B of the body and the annular support element 21 for the magnets 18, will be configured with reciprocal engageable and disengageable hooking or clamping means, for example with a bayonet-type attachment, or a steel wire ring, or with any other attachment means that will prevent the support element 21 from falling down.

For example, in the case of FIGS. 5 to 7, a bayonet-type attachment has been shown, including a pair of diametrically opposite fins 26, at the lower edge of the cylindrical wall of the body part 10B; the fins 26 are configured to pass through openings 27 in diametrically opposite positions on a radial flange 28 inside the same annular support element 21. Therefore by turning the annular element 21 in one direction or in an opposite direction as indicated by the double arrow W3, and axially moving the same support element 21 in the direction of the double arrow W2, it is possible to engage and disengage the annular element 21 from the body 10 of the separator.

From what has been said and shown, it is thus evident that a magnetic particle separator has been provided for separating magnetic and non-magnetic particles from a thermal fluid flowing in a heating system, in which the particle separator comprises:

a hollow body configured with an upper particle separation chamber having an inlet and an outlet port for the fluid;

means in the particle separation chamber configured to cause a reduction in the fluid flow velocity, and a separation by gravity of the magnetic and non-magnetic particles entrained by the fluid;

a quieting chamber positioned below and in fluid communication with the upper separation chamber, said quieting chamber having a bottom outlet port; and magnet means to attract the magnetic particles of the fluid;

characterized in that the magnet means comprises:

one or more permanent magnets arranged outside the quieting chamber; and an annularly shaped magnet support element removably connectable outside the hollow body around a peripheral wall of the quieting chamber of the separator device.

Thus, within the solutions described above, other changes and/or variations both to the separator body and to the magnet support element, or parts thereof, can be made without thereby departing from the claims.

The invention claimed is:

1. A magnetic particle separator, for separating magnetic and non-magnetic particles entrained by a thermal fluid in a heating system, comprising:

an upper cup-shaped hollow body configured with a particle separation chamber having a longitudinal axis and inlet and outlet ports orthogonally arranged to said longitudinal axis, said inlet and outlet ports providing an upper flow-path;

a lower cup-shaped hollow body having a bottom and a peripheral wall providing a quieting chamber, and a particle discharge port at the bottom wall;

filter means axially extending into the particle separation chamber, across the upper flow-path, the filter means having a bottom side facing the quieting chamber;

wherein the quieting chamber is positioned below and in fluid communication with the particle separation chamber by an intermediate transition zone; the transition zone being arranged between the bottom side of the filter means and the quieting chamber to separate the quieting chamber from the upper flow-path;

wherein the filter means are configured to provide a deviation of the fluid and a reduction of the fluid velocity to cause separation of magnetic and non-magnetic particles in the particle separation chamber from the thermal fluid flowing along the upper flow path, and fall-down by gravity into the quieting chamber; and an annularly shaped magnet support element provided with one or more radially polarized permanent magnets for retaining the magnetic particles against an inner surface of the peripheral wall of the quieting chamber;

said annularly shaped magnet support element and said one or more radially polarized permanent magnets circumferentially extending around at least a part of a peripheral wall of the quieting chamber of the separator.

2. The magnetic particle separator according to claim 1, wherein the magnet support element and the lower cup-shaped hollow body of the separator, are provided with engageable and disengageable connecting means.

3. The magnetic particle separator according to claim 2, wherein the magnet support element consists of an elastically deformable annular element in the form of an opened ring.

4. The magnetic particle separator according to claim 2, wherein the magnet support element consists of an annular element in the form of a closed ring.

5. The magnetic particle separator according to claim 4, wherein the closed ring of the magnet support element and the lower cup-shaped hollow body of the separator comprise engageable and disengageable connecting means.

6. The magnetic particle separator according to claim 1, wherein the permanent magnets are axially extending along at least part of the peripheral wall of the quieting chamber.

7. The magnetic particle separator according to claim 1, wherein the filter means are configured for reducing the flow velocity of the fluid flowing between the inlet and the outlet ports.

8. The magnetic particle separator according to claim 7, wherein the filter means for reducing the flow velocity consists of a filtering cartridge.

9. The magnetic particle separator according to claim 1, wherein the particle discharge port is provided with a manually actuatable purging valve.

* * * * *